(No Model.)

G. W. BARTLETT.
CAR COUPLING.

No. 531,430. Patented Dec. 25, 1894.

Witnesses

Inventor
George W. Bartlett
By Alexander & Davis
Attorneys

UNITED STATES PATENT OFFICE.

GEORGE W. BARTLETT, OF LINEVILLE, ALABAMA.

CAR-COUPLING.

SPECIFICATION forming part of Letters Patent No. 531,430, dated December 25, 1894.

Application filed June 1, 1894. Serial No. 513,191. (No model.)

*To all whom it may concern:*

Be it known that I, GEORGE W. BARTLETT, a citizen of the United States, residing at Lineville, in the county of Clay and State of Alabama, have invented certain new and useful Improvements in Car-Couplings, of which the following is a specification, reference being had therein to the accompanying drawings.

This invention relates to a new and improved car coupling, and it has for its object to provide an automatic coupling device which may be readily attached to cars using the ordinary pin and link draw-head.

It also has for its object to provide means for operating the pin from the side of the car, all of which is fully hereinafter set forth and particularly pointed out in the claims appended.

Figure 1:
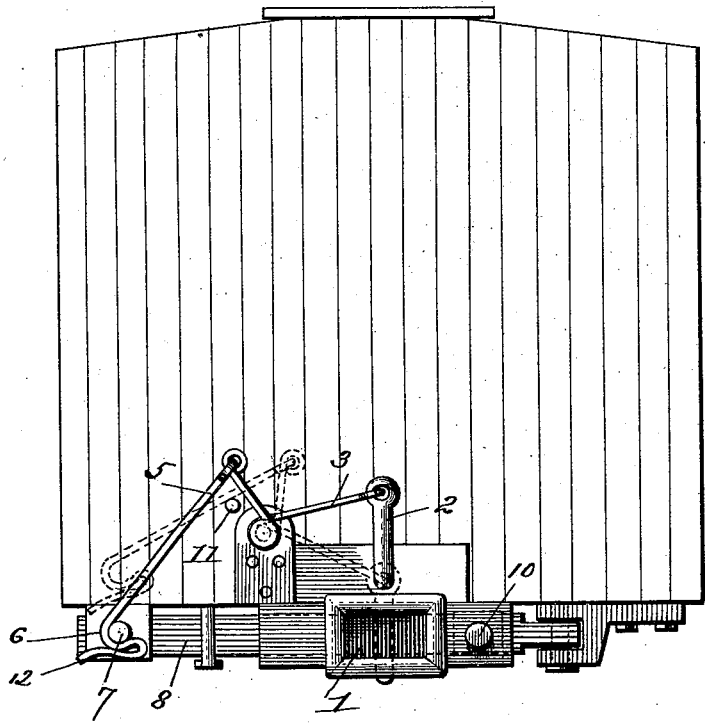
Figure 2:
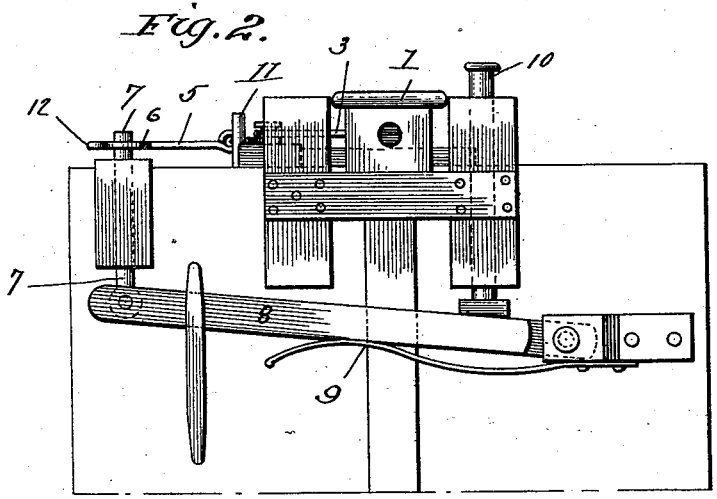

In the drawings:—Figure 1 is an elevation of an end of a car showing my coupling in position; and Fig. 2 is a bottom plan thereof.

Referring to the various parts by numerals, 1 designates the draw-head of an ordinary pin-and-link coupling; 2, the pin thereof; 3, an angle-lever pivoted to the car above the draw-head and to one side thereof, said lever carrying at one of its ends the pin 2, said pin being in a position to be lowered by said lever into the pin-opening in the draw-head; 5, a depending bar pivoted on the other end of lever 3, said bar being formed at its lower end into a hook 6; 7, a horizontal spring-actuated sliding-bar mounted in suitable bearings secured to the under side of the car, at one side of the draw-head, its front end projecting a suitable distance forward of the end of the car to be engaged by the hook 6 of the bar 5, as shown; 8, a horizontal lever pivoted to the under side of the car, to the outer free end of which the inner end of the sliding bar 7 is pivoted, the other end of said lever being pivoted on a bearing suitably located near the side of the car opposite the bar 7; 9, a strong leaf-spring bearing with its free end against the rear side of the lever 8 and forcing it toward the end of the car and thereby normally holding the bar 7 out beyond the end of the car, to be engaged by the hook 6, as shown; 10, a sliding push-bar located at one side of the draw-head, and mounted in suitable bearings secured to the under side of the car. The inner end of said bar bears against the forward side of the lever 8, and its outer end extends out beyond the end of the car and is in position to be operated upon by the buffer of an approaching car and to be forced inward by said car. As said bar is forced inwardly it contacts with the lever 8 and forces it inwardly, thereby drawing inward the bar 7 and releasing the hook 6 from it and dropping the pin into the draw-head.

Secured to the end of the car near the outer side of the upwardly extending arm of the angle-lever 3, is a pin 11, against which the bar 5 rests when released from the sliding bar 5. The object of resting the bar 5 on said pin is to hold its lower end out near the side of the car in a position to be easily grasped by an operator from the side of the car so that the cars may be uncoupled without the necessity of going between them. On the bar 5 is formed an outwardly projecting handle 12 which may be conveniently grasped in operating the device.

From the foregoing, when taken in connection with the drawings annexed the operation and advantages of my invention will be readily understood.

Having thus fully described my invention, what I claim is—

1. A car-coupling consisting of a draw-head, a coupling pin, means for supporting said pin above the drawhead and for automatically dropping it, said means consisting of the pivoted angle-lever 3, the bar 5 pivoted on lever 3 and formed with the hook 6, the horizontal sliding-bar 7, over which the hook 6 engages, and means operated by an approaching car for withdrawing the bar 7 to drop the pin, substantially as described.

2. A car-coupling consisting of a draw-head a coupling pin, means for supporting said pin above the draw-head and for automatically dropping it, said means consisting of the pivoted angle-lever 3, the bar 5 pivoted on lever 3 and formed with the hook 6, the horizontal sliding-bar 7 over which the hook 6 engages, a spring pressed lever 8, and a push-bar as 10, its inner end bearing against the lever 8, its front end projecting forward of the end of the car, substantially as described and for the purpose set forth.

3. A car-coupling consisting of a draw-head, a coupling pin, means for supporting said pin above the drawhead and for automatically dropping it, said means consisting of the pivoted angle-lever 3, the bar 5 pivoted on lever 3 and formed with the hook 6, the horizontal sliding-bar 7 over which the hook 6 engages, and means operated by an approaching car for withdrawing the bar 7 to drop the pin, a pin 11 to support the bar 5, when it is released from bar 7, and a handle 12 formed on the bar 5 near its lower end, substantially as described and for the purpose set forth.

In testimony whereof I affix my signature in presence of two witnesses.

GEO. W. BARTLETT.

Witnesses:
J. A. HOLDER,
H. A. BARTLETT.